United States Patent [19]

Metivier

[11] Patent Number: 5,253,913
[45] Date of Patent: Oct. 19, 1993

[54] TRUCK BED PARTITION

[75] Inventor: Pierre Metivier, Phoenix, Ariz.

[73] Assignee: William F. Baker, Glendale, Ariz.

[21] Appl. No.: 915,905

[22] Filed: Jul. 17, 1992

[51] Int. Cl.$^5$ .............................................. B60R 5/04
[52] U.S. Cl. .................................. 296/37.6; 296/24.1
[58] Field of Search .................. 296/37.6, 37.1, 37.16, 296/24.1; 410/96

[56] References Cited

U.S. PATENT DOCUMENTS

| | | | |
|---|---|---|---|
| 4,451,075 | 5/1984 | Canfield | 296/37.6 |
| 4,750,773 | 6/1988 | Chapline et al. | 296/37.6 |
| 5,121,958 | 6/1992 | Goeden et al. | 296/37.1 |
| 5,147,103 | 9/1992 | Ducote | 296/37.6 |

Primary Examiner—Robert R. Song
Attorney, Agent, or Firm—Don J. Flickinger; Jordan M. Meschkow; Robert A. Parsons

[57] ABSTRACT

A truck bed partition including a cargo cage pivotally mounted to a truck bed by mounting members. Truck bed partition 10 is pivotally mounted to side walls of the truck bed proximate the front wall or the rear wall.

14 Claims, 2 Drawing Sheets

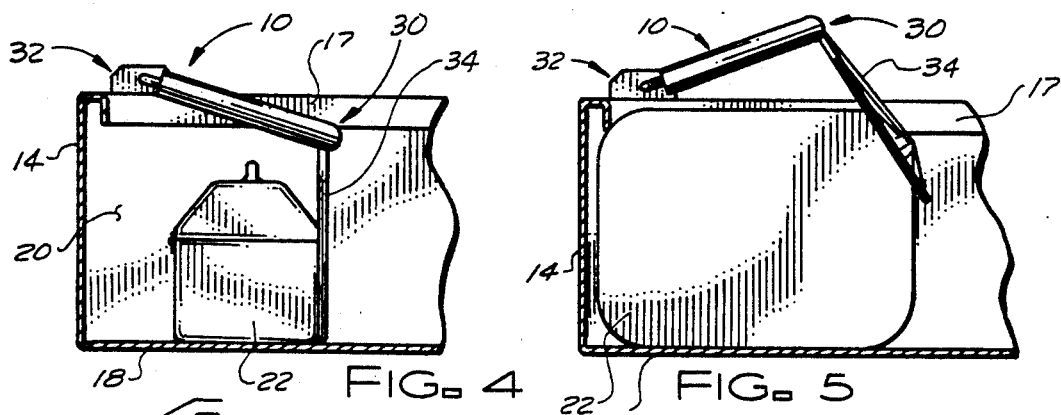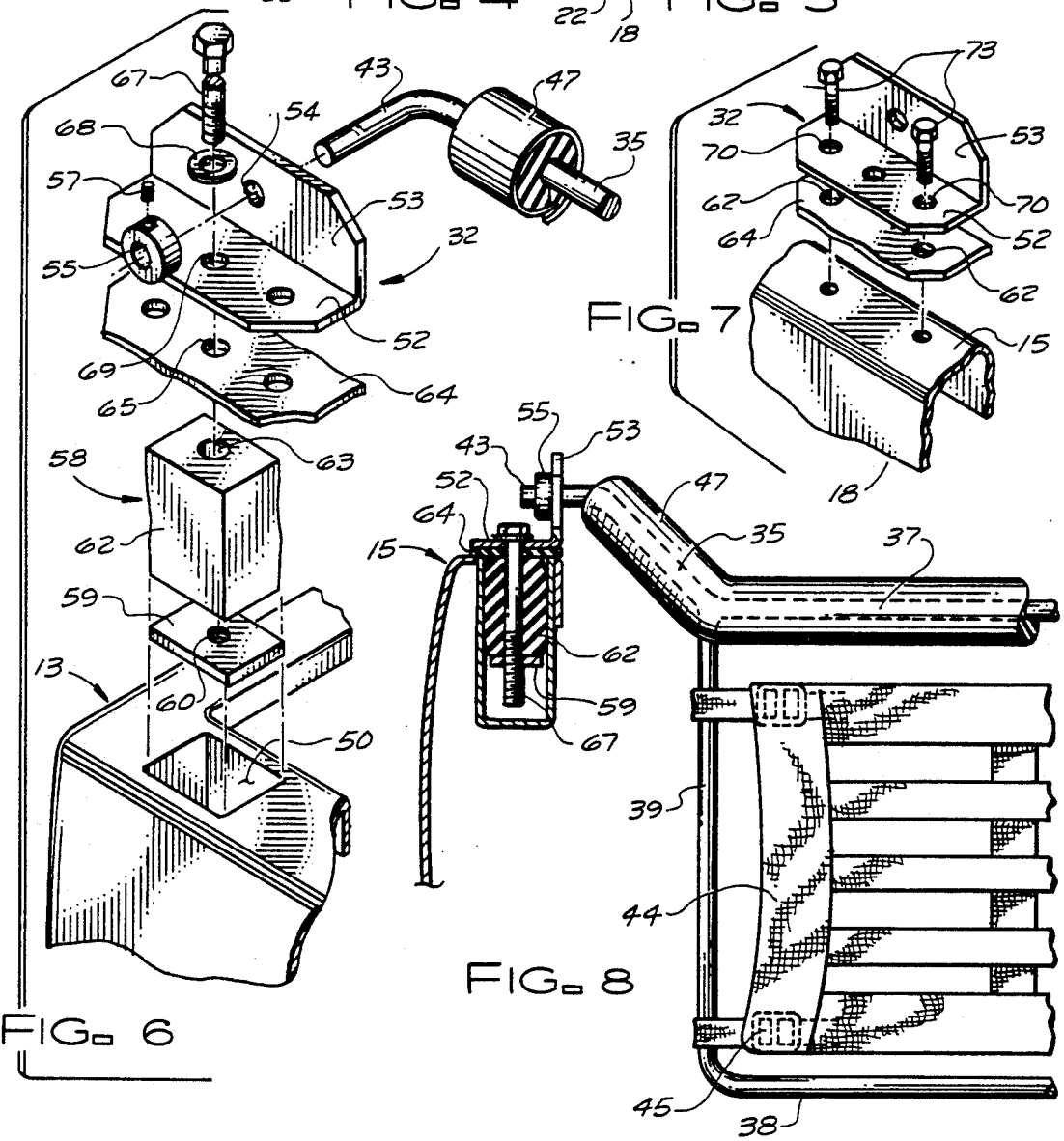

TRUCK BED PARTITION

BACKGROUND OF THE INVENTION

1. Field of the Invention

This invention relates to accessories for use on vehicles.

More particularly, the present invention relates to an accessory for retaining objects in a pick-up truck bed.

2. Prior Art

Pick-up trucks are very handy for carrying large bulky objects because of their large cargo space, in the form of a truck bed. While large objects may be easily carried because of this large cargo space, this same large space causes problems when smaller objects are carried. Large objects which fill the truck bed offer no problems since their movement is limited by the walls of the truck bed. Even if the large objects have room to move, this offers little problem since they can be held in place by ropes or the like. Smaller objects or containers offer more of a problem, because the walls of the truck bed do not prevent them from moving. These smaller objects have a tendency to shift during transport. This shifting or moving of the objects in the truck bed can damage the object or the truck bed, as well as distract the driver from his driving. Simply tying down smaller objects as can be done with larger objects is impractical, and for most objects, practically impossible.

Therefore, devices have been developed in an attempt to adapt a truck bed for use in carrying smaller objects. A frequently used device is a metal tool chest which is mounted across the bed of the truck directly behind the cab. These boxes can be locked, and are opened from the top. The tool boxes are very useful for storing objects that are relatively small, and are generally used to carry tools which the operator desires to have present at all times. The drawbacks with this device are that they tend to be expensive, and are of a rigid construction which prohibits storing objects larger than the dimensions of the chest. The tool chest cannot be altered to accommodate larger objects.

A device that is used, which is relatively inexpensive, is a fish net that attaches to the front side of a truck bed. It holds loose items by trapping them tightly against the front of the truck bed. It has elastic along its top edge. The operator must pull the elastic edge away from the cab of the truck to place items inside the netting. This device tends to have a limit to the size of object it can hold. Only small items would fit into and be supported by this net.

It would be highly advantageous, therefore, to remedy the foregoing and other deficiencies inherent in the prior art.

Accordingly, it is an object of the present invention to provide a new and improve truck bed partition.

Another object of the present invention is to provide a truck bed partition which restricts loose items to a small area in the truck bed.

And another object of the present invention is to provide a truck bed partition which is relatively inexpensive.

Still another object of the present invention is to provide a truck bed partition which is easily installed on a truck.

Yet another object of the present invention is to provide a device which may be used to retain objects in the front part or rear part of a truck bed.

Yet still another object of the present invention is to provide a device which will retain small objects.

A further object of the present invention is to provide a device which may be modified to accommodate larger objects.

And a further object of the present invention is to provide a device which may be used on a wide variety of pick up trucks.

SUMMARY OF THE INVENTION

Briefly, to achieve the desired objects of the instant invention in accordance with a preferred embodiment thereof, provided is a cargo cage having a body and spacer arms which are pivotally mounted to mounting members. The mounting members are mounted to the side walls of a truck bed by mounting means which may be a friction assembly or sheet metal screws, possession proximate the front or the back of the truck bed. The cargo cage is mounted proximate the front or the back of the truck bed to form a cargo space between the cargo cage and the front wall or rear wall of the truck bed. The cargo cage is pivotally mounted to accommodate larger or smaller articles within the cargo space.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 4 is a side view illustrating the truck bed partition installed on a truck bed and retaining a small object;

FIG. 5 is a side view of the truck bed partition installed on a truck bed, illustrating the retention of a larger object;

FIG. 6 is an exploded view of an attachment assembly of the truck bed partition;

FIG. 7 is an alternate embodiment of an attachment assembly; and

FIG. 8 is a cut away side view of the attachment assembly illustrated in FIG. 6 as it would appear installed on a truck bed.

DETAILED DESCRIPTION OF THE PREFERRED EMBODIMENT

Figure 1:
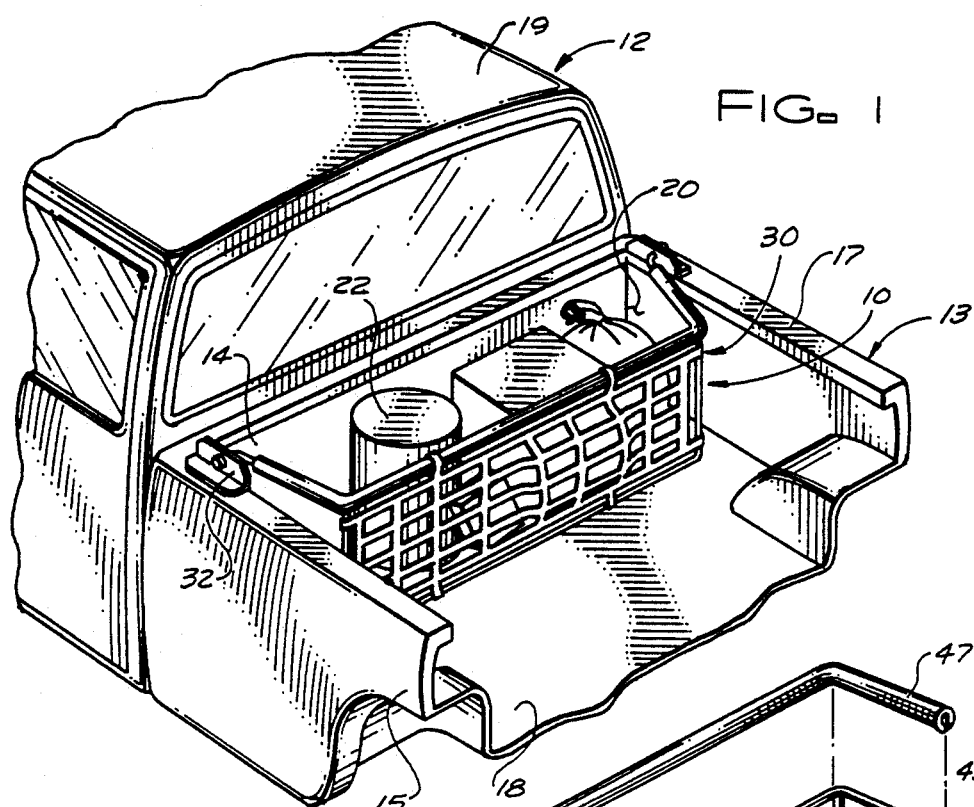
FIG. 1 is a perspective view of a truck bed partition, constructed in accordance with the teachings of the instant invention, as it would appear installed in a truck bed, retaining loose items.

Turning now to the drawings in which like reference characters indicate corresponding elements throughout the several views, attention is first directed to FIG. 1 which illustrates a truck bed partition generally designated 10 installed on a pick-up truck 12. Pick-up truck 12 has a truck bed 13 with a forward wall 14 side walls 15, 17 and floor 18. A cab 19 is forward of forward wall 14. Truck bed partition 10 is attached to truck bed 13 at side walls 15 and 17, forming a cargo space 20 against forward wall 14 which contains loose articles 22.

Figure 2:
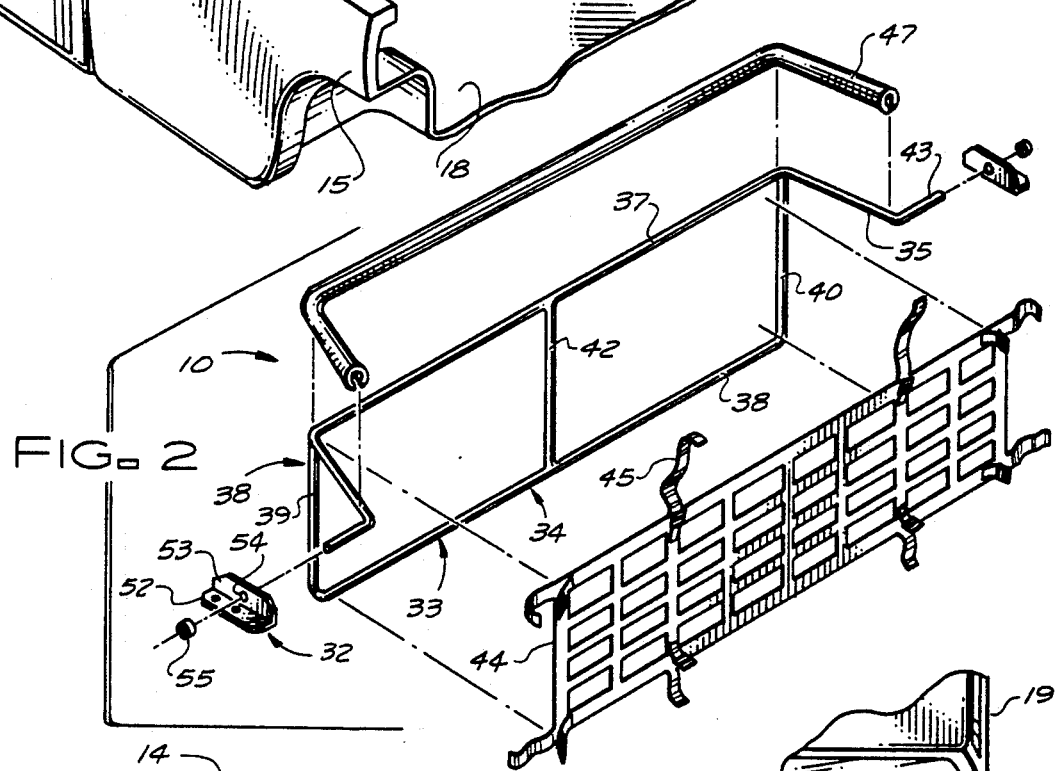
FIG. 2 is an exploded perspective view of the truck bed partition

Referring now FIG. 2, truck bed partition 10 consist of mounting members 32 for mounting a cargo cage 30 to truck bed 13. Cargo cage 30 includes a frame 33 having a generally rectangular body 34 and spacer arms 35. Body 34 consist of an upper bar 37 a lower bar 38 parallel to upper bar 37, side bars 39 and 40 extending vertically between upper bar 37 and lower bar 38, and a center bar 42 extending between upper bar 37 and lower bar 38 to provide additional support therebetween. It will be understood by those skilled in the art that additional bars may be added for additional support when a wider truck bed is involved or less bars if less support is needed as in when the truck bed is narrow.

Spacer arms 35 extend generally perpendicularly from the junction of upper bar 37 and side bars 39 and 40 and generally horizontal with respect to floor 18 of truck bed 13 when installed. Spacer arms 35 have a slight outward flare and terminate in attachment ends 43 which are generally perpendicular to spacer arms 35 and extend outward parallel to upper bar 37 and lower bar 38.

To prevent loose articles 22 from passing through body 34, a net 44 having fasteners 45 is used. Net 44 is attached to body 34 by a number of fasteners 45 which extend from net 44 and fasten around upper bar 37, lower bar 38 and side bars 39 and 40. A variety of fasteners 45 may be employed for this purpose, including simple ties which could be tied around body 34, or as illustrated in this embodiment, fasteners 45 having hook and loop type engagement pairs on the ends thereof. Buckles may also be employed. To help protect loose articles 22, a roll bar type pad 47 is fastened to upper bar 37 and spacer arms 35.

Figure 3:
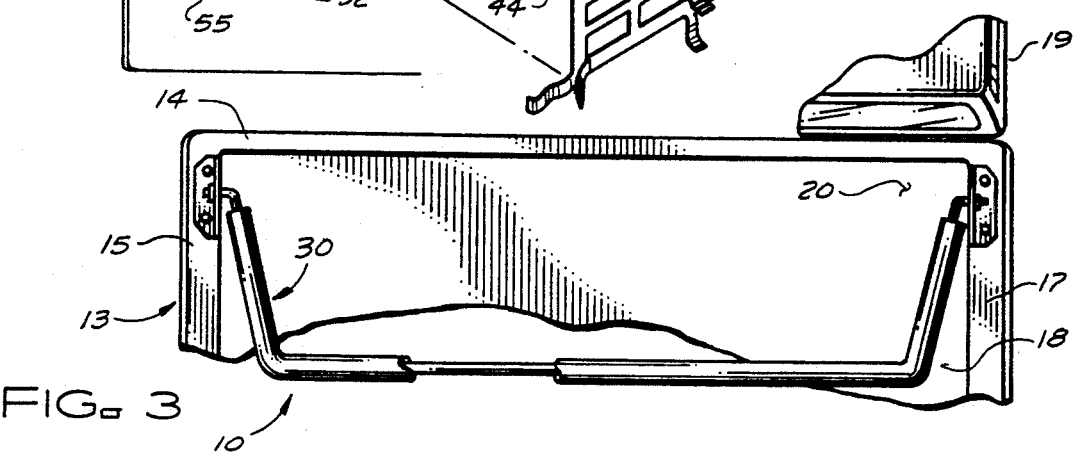
FIG. 3 is a top plan view of the truck bed partition installed on a truck bed.

Referring now to FIG. 3, truck bed partition 10 is illustrated coupled to truck bed 13 to form cargo space 20 between cargo cage 30 and forward wall 14 of truck bed 13. While truck bed partition 10 is shown attached to truck bed 13 proximate front wall 14, those skilled in the art will understand that truck bed partition 10 may also be coupled to truck bed 13 proximate a tail gate (not shown). Loose articles 22 such as tool boxes, coolers, groceries, etc. can be placed in cargo space 20, as shown in FIG. 4, to restrict the movement of loose items hauled in a truck bed. This prevents shifting of loose articles 22, preventing damage to the article or the truck bed. Still referring to FIG. 4, a variety of different size articles can be placed in cargo space 20. However, if a larger article or container is being hauled in truck bed 13, and its dimensions are greater than the dimensions of cargo space 20, cargo cage 30 can be rotated upward with lower bar 38 being removed from contact with floor 18. As can be seen in FIG. 5, this allows a much larger article to placed in cargo space 20 and held in place by cargo cage 30. In this case, truck bed partition 10 actually presses against and holds down the larger item which does not fit entirely within cargo space 20. The operator rotates cargo cage 30 upward by hand, positioning the item underneath, then lowers cargo cage 30 to capture the item in place.

Referring now to FIG. 6, mounting member 32 is illustrated being mounted to side wall 15 and 17 of truck bed 13 using a post hole 50, which is found in most conventional pick-up trucks.

Mounting members 32 are angle mounting plates having a lower plate 52 and upright plate 53 coupled to lower plate 52 at a right angle. A bore 54 extends through upright plate 53 to receive attachment ends 43 of cargo cage 30. Attachment ends 43 are journaled in bores 54 and are rotatably secured therein by a collar 55 coupled to attachment end 43 projecting outward from bore 54. Collar 55 employs a set screw 57 which engages attachment end 43 to prevent its withdrawal from bores 54.

Mounting member 32 are attached to truck bed 13 by a friction assembly 58 consisting of a compression plate 59 having a threaded bore 60, a resilient block of material, preferably a rubber block 62 configured to be received by post hole 50 and having a bore 63 extending vertically therethrough, and a pad 64 having a bore 65. Compression plate 59 is inserted into post hole 50, followed by rubber block 62. Pad 64 is placed across post hole 50, to protect truck bed 13 from mounting member 32. A bolt 67 with washer 68 is inserted through a bore 69 formed in lower plate 52. Mounting member 32 with bolt 67 extending therethrough is positioned over post hole 50, with bolt 67 extending down through bore 65 of pad 64, bore 63 of rubber block 62, and threadibly engaged with threaded bore 60 of compression plate 59.

Referring now to FIG. 8, as bolt 67 is threaded through threaded bore 60 of compression plate 59, compression plate 59 is drawn upward compressing rubber block 62. The longitudinal compression of rubber block 62 results in an outward expansion of rubber block 62 securely holding rubber block 62 in post hole 50, and mounting member 32 in place.

An alternate mounting means is illustrated in FIG. 7, were a pair of bores 70 is formed in lower plate 52 of mounting members 32, corresponding to a pair of bores 72 formed in pad 64. A pair of sheet metal screws 73 are inserted through bores 70 and 62 and threaded into side walls 15 and 17 of truck bed 13.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

I claim:

1. A truck bed partition for retaining loose articles in a specific portion of a truck bed, said partition comprising:

a cargo cage including:

a frame having an upper member for extending substantially transverse of said truck bed;

spacer arms, each having an attachment end, extending from said frame;

said spacer arms disposed at a transverse angle to said top member;

mounting members attachable to said truck bed; and a securement member for rotatably securing each of said attachment ends to a respective one of said mounting members.

2. A truck bed partition as claimed in claim 1 wherein said mounting members further comprise:

a mounting plate;

said attachment end of said spacer arm rotatably coupled to said mounting plate; and attachment means for coupling said mounting plate to said truck bed.

3. A truck bed partition as claimed in claim 2 further including:

a bore extending through said mounting plate configured to receive said attachment end of said spacer arm; and a collar to pivotally retain said attachment end of said spacer arm journaled in said bore.

4. A truck bed partition as claimed in claim 3 wherein said mounting plate further comprises:
  a horizontal portion configured to be coupled to said truck bed by said attachment means; and
  a vertical portion coupled perpendicularly to said horizontal portion and defining said bore.

5. A truck bed partition as claimed in claim 2 wherein said attachment means is a friction assembly.

6. A truck bed partition as claimed in claim 5 wherein said friction assembly includes
  a resilient block;
  a compression plate; and
  a bolt extending through said resilient block and said compression plate to distort said resilient block by drawing said compression plate thereagainst.

7. A truck bed partition as claimed in claim 2 wherein said attachment means are sheet metal screws for insertion through said mounting plate into said truck bed.

8. A truck bed partition for retaining loose items in a specific portion of a truck bed having an end wall, sidewalls, and floor, wherein said device comprises:
  a cargo cage including:
  a frame extending substantially between said sidewalls;
  spacer arms, each having an attachment end, extending from said frame;
  said spacer arms disposed to extend along said sidewalls, at a transverse angle to said frame;
  mounting members attachable to said sidewalls of said truck bed;
  a securement member for rotatably securing each of said attachment ends to a respective one of said mounting members; and
  a cargo space defined between said cargo cage and said endwall.

9. a truck bed partition as claimed in claim 8 wherein said mounting members further comprise:
  a mounting plate;
  said attachment end of said spacer arm rotatably coupled to said mounting plate; and
  attachment means for coupling said mounting plate to said sidewalls of said truck bed.

10. A truck bed partition as claimed in claim 9 further including:
  a bore extending through said mounting plate configured to receive said attachment end of said spacer arm; and
  a collar to pivotally retain said attachment end of said spacer arm journaled in said bore.

11. A truck bed partition as claimed in claim 10 wherein said mounting plate further comprises:
  a horizontal portion configured to be coupled to said sidewall of said truck bed by said attachment means; and
  a vertical portion coupled perpendicularly to said horizontal portion and defining said bore.

12. A truck bed partition as claimed in claim 9, wherein said attachment means is a friction assembly.

13. A truck bed partition as claimed in claim 12, said truck bed including post holes in said sidewalls, wherein said friction assembly includes:
  a compression plate inserted in said post hole;
  a bolt extending through said mounting plate, said resilient block and said compression plate to distort said resilient block by drawing said compression plate thereagainst.

14. A truck bed partition as claimed in claim 9 wherein said attachment means are sheet metal screws for insertion through said mounting plate into said truck bed.

* * * * *

UNITED STATES PATENT AND TRADEMARK OFFICE
CERTIFICATE OF CORRECTION

PATENT NO. : 5,253,913

DATED : 19 October 1993

INVENTOR(S) : Pierre Metivier

It is certified that error appears in the above-identified patent and that said Letters Patent is hereby corrected as shown below:

Column 4, Line 52 (Claim 1), "top" should be --upper--.

Column 5, Line 13 (Claim 6), insert --:-- after "includes".

Signed and Sealed this

Twenty-sixth Day of July, 1994

Attest:

BRUCE LEHMAN

Attesting Officer        Commissioner of Patents and Trademarks